United States Patent
Lundberg et al.

(10) Patent No.: US 8,471,731 B2
(45) Date of Patent: Jun. 25, 2013

(54) NEAR END-OF-LIFE INDICATION FOR LIGHT EMITTING DIODE (LED) AIRCRAFT NAVIGATION LIGHT

(75) Inventors: John Lundberg, Springfield, OH (US); David Barnett, Urbana, OH (US); Saed M. Mubaslat, Miamisburg, OH (US)

(73) Assignee: Honeywell International Inc., Morristown, NJ (US)

(*) Notice: Subject to any disclaimer, the term of this patent is extended or adjusted under 35 U.S.C. 154(b) by 922 days.

(21) Appl. No.: 12/498,992

(22) Filed: Jul. 7, 2009

(65) Prior Publication Data

US 2011/0006919 A1 Jan. 13, 2011

(51) Int. Cl.
*G01C 21/00* (2006.01)
*G01C 23/00* (2006.01)

(52) U.S. Cl.
USPC ........... 340/971; 340/945; 340/963; 340/635; 340/691.4

(58) Field of Classification Search
USPC .................. 340/963, 945, 971, 636.1, 691.1, 340/691.4
See application file for complete search history.

(56) References Cited

U.S. PATENT DOCUMENTS

| | | | |
|---|---|---|---|
| 4,797,609 A * | 1/1989 | Yang | 324/762.07 |
| 6,348,766 B1 * | 2/2002 | Ohishi et al. | 315/200 A |
| 6,350,978 B1 * | 2/2002 | Kasai | 250/205 |
| 7,391,335 B2 * | 6/2008 | Mubaslat et al. | 340/657 |
| 7,675,248 B2 * | 3/2010 | Mubaslat et al. | 315/308 |
| 2005/0206529 A1 * | 9/2005 | St.-Germain | 340/815.45 |
| 2007/0040696 A1 * | 2/2007 | Mubaslat et al. | 340/657 |
| 2008/0062070 A1 | 3/2008 | De Oto et al. | |
| 2008/0297065 A1 * | 12/2008 | Mubaslat et al. | 315/291 |
| 2010/0103665 A1 * | 4/2010 | Mubaslat et al. | 362/234 |
| 2011/0006919 A1 * | 1/2011 | Lundberg et al. | 340/963 |

* cited by examiner

*Primary Examiner* — Travis Hunnings
(74) *Attorney, Agent, or Firm* — Lowe Graham Jones PLLC

(57) ABSTRACT

A system and method for determining when a LED-based position light is nearing its end of life by providing to maintenance personnel visible indication that end of life is approaching. An example system includes a controller, a main LED light, an indicator LED light, a first elapsed time counter, a second elapsed time counter, and an oscillator. The first elapsed time counter recognizes when a first time threshold is exceeded, causing the indicator LED light to flash and triggering the second elapsed time counter to start counting. The second elapsed time counter recognizes when a second time threshold is exceeded, disabling both the indicator LED light and the main LED lights, thereby notifying maintenance personnel that the main LED lights have reached their end of life.

16 Claims, 5 Drawing Sheets

NEAR END-OF-LIFE INDICATION FOR LIGHT EMITTING DIODE (LED) AIRCRAFT NAVIGATION LIGHT

BACKGROUND OF THE INVENTION

In vehicle applications, such as aviation and boating, vehicle-to-vehicle collisions are prevented by mounting navigation lights on the exterior of the vehicle. The lights function by alerting approaching vehicles of the presence and orientation of the first vehicle. The success navigation lights have in preventing collisions is partly due to an industry standard that dictates the color of light a navigation light must emit depending on the light's position on the body of the vehicle. Based on the color pattern of navigation lights visible to an approaching vehicle, the approaching vehicle can quickly deduce the direction, and therefore heading, of the vehicle it is approaching. For example green, red or white are often used to indicate the starboard, port or rear positions of a vehicle, respectively.

Several types of lighting are used in navigation light applications. One lighting type is the light emitting diode (LED). One problem with LED lighting in navigation lighting applications is that LED lights degrade gradually over time, compared with the catastrophic failure of incandescent lights. As a consequence of their gradual failure, LED lights carry the risk of being left in use after their level of intensity has degraded below that required for industry compliance. The airline industry imposes minimum standards for intensity level, as shown in the following table. According to industry guidelines, an aircraft should not be allowed to dispatch without navigation lights that are compliant with the following minimum standards:

| Degrees from longitudinal axis | 0-10 | 10-20. | 20-110 | 110-180 |
|---|---|---|---|---|
| Minimum intensity (cd) | 40 | 30 | 5 | 20 |

To prevent LED lights from being inadvertently left in operation after their intensity has fallen below an accepted intensity threshold, a number of systems have been developed. One system is a timer system that disables LED light operation after a certain period of time. Another is a manual maintenance log system. The timer system does provide a level of assurance that the lights will comply with requirements, however disablement can occur unexpectedly, leading to the need for unexpected delays in vehicle operation for maintenance. The manual maintenance log system suffers from the requirement for human diligence. An ideal maintenance system would provide an indication a certain period of time in advance that an LED lighting system is approaching the time when it needs to be replaced.

SUMMARY OF THE INVENTION

The present invention provides systems and methods for determining when an LED-based navigation light is nearing its end of life, and for providing visible indication to maintenance personnel that the light's end of life is approaching.

An example system includes a controller, a main LED light, an indicator LED light, a first elapsed time counter, a second elapsed time counter, and an oscillator. According to the method, the first elapsed time counter monitors the time that the main LED lights are illuminated. When the elapsed time counter recognizes that a first threshold is exceeded, the first elapsed time counter outputs a signal to the oscillator and to the second elapsed time counter. The oscillator enables the indicator LED light to illuminate and/or flash, providing an indication to maintenance personnel that the main LED lights have entered a near end of life period.

The second elapsed time counter starts counting, measuring the duration of time the main LED lights are illuminated during the near end of life period. When the second elapsed time counter recognizes that a second threshold is exceeded, the second elapsed time counter outputs a signal that disables both the indicator LED lights and the main LED lights. Disablement of both the main and indicator LED lights notifies maintenance personnel that the main LED lights have reached their end of life. In an alternative approach, the indicator LED light continues to illuminate and/or flash after the main LEDs are disabled due to exceeding the second time threshold. In a third approach, the indicator LED light continues to illuminate and/or flash after the main LEDs are disabled from exceeding the second time threshold, but flashes at a different frequency or according to a different pattern than during the period before the second time threshold.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
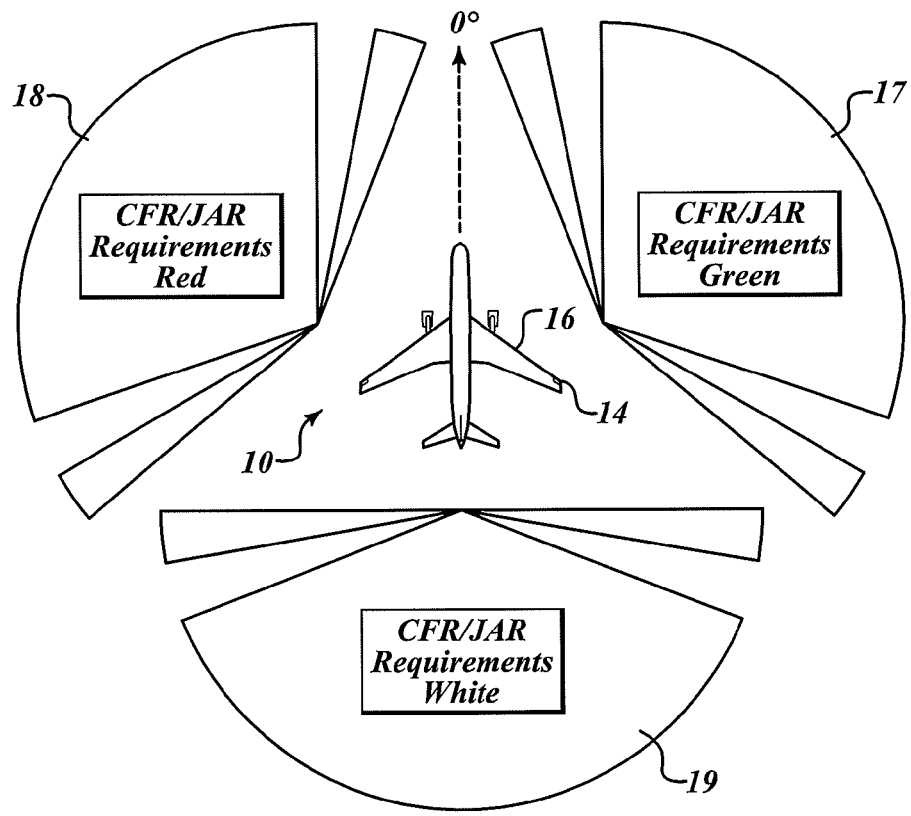
FIG. 1 illustrates a top view of an aircraft having an example light emitting diode (LED) navigation light module formed in accordance with an embodiment of the present invention.

FIG. 1 illustrates an aircraft 10 having a light emitting diode (LED) navigation light module 14 mounted to a wing 16. The LED navigation light module 14 prevents collisions with other aircraft by alerting approaching aircraft of the presence and navigation direction of the aircraft 10. FIG. 1 also illustrates an example of the illumination requirements by color for various illumination zones 17, 18, 19 around the aircraft 10 according to one industry standard.

Figure 2:
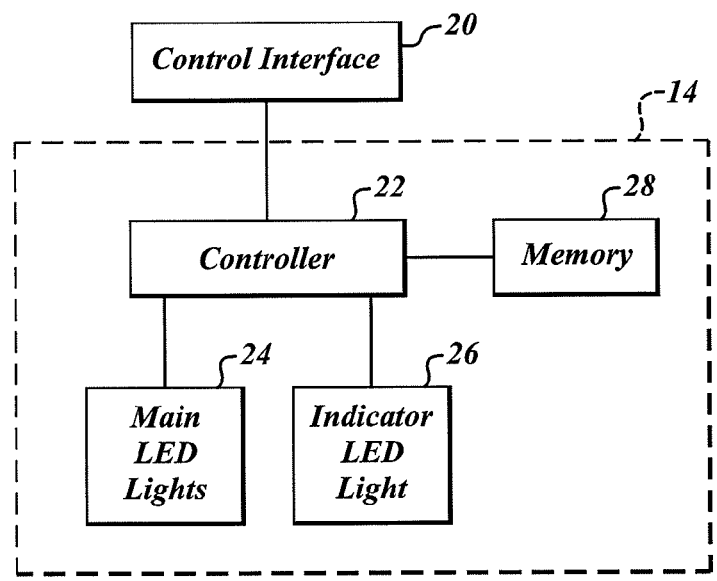
FIG. 2 illustrates a block diagram of the LED navigation light module shown in FIG. 1.

FIG. 2 illustrates a block diagram of the LED navigation light module 14 and a control interface 20. The LED navigation light module 14 includes a controller 22, main LED lights 24, an indicator LED light 26 and a memory 28.

The control interface 20 is in signal communication with the controller 22. The controller 22 is in signal communication with both the main LED lights 24 and the indicator LED light 26, and memory 28. In this embodiment, the control interface 20 is located remotely from the LED navigation light module 14 however in other embodiments the control interface 20 can be located within the LED navigation light module 14. The main LED lights 24 alert approaching aircraft to the position and direction of the aircraft 10. The indicator LED light 26 visibly alerts maintenance personnel when the main LED lights 24 are nearing their end of life. The memory 28 stores current and historical information about the operation of the LED navigation light module 14 that maintenance personnel are able to access and view.

The control interface 20 allows personnel to change control parameters that affect the operation of the LED navigation light module 14. In one embodiment, the control interface 20 is located within the LED navigation module 14, so that the control interface 20 is accessible to personnel. In another embodiment, the control interface 20 is located in a cockpit of the aircraft 10, so that the control interface 20 is accessible to a pilot or flight crew. In another embodiment, the control interface 20 is within the LED navigation module 14, but an indication signal is also passed to the aircraft cockpit to alert the pilot or flight crew.

Figure 3:
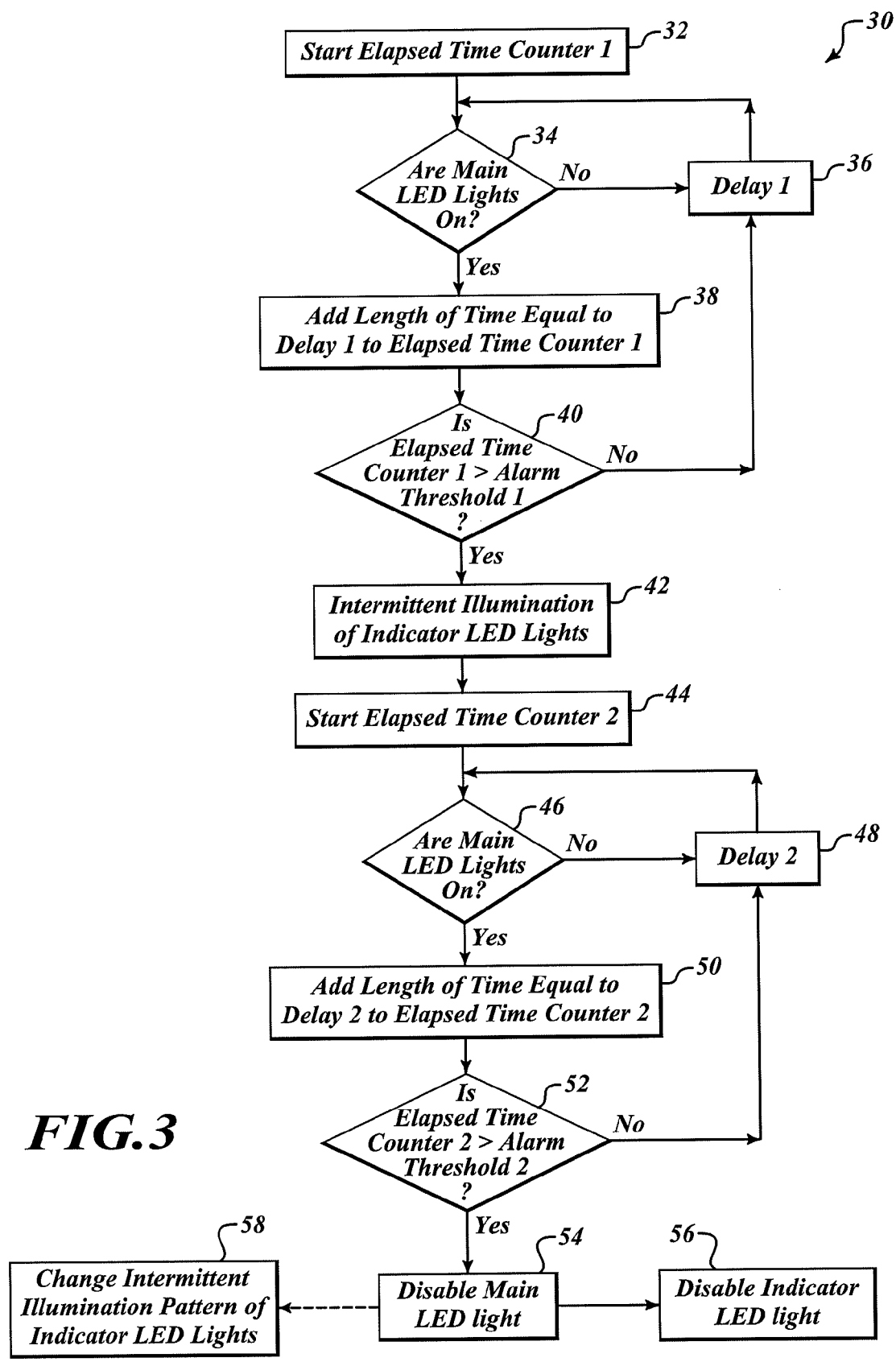
FIG. 3 illustrates a flow diagram of an example method performed by the LED navigation light module of FIG. 2.

FIG. 3 illustrates a flow diagram of an example process 30 as performed by the LED navigation light module 14 of FIG. 2. Starting at a block 32, the example process 30 starts an elapsed time counter 1. Next at a first decision block 34, the example process 30 determines if the main LED lights 24 are on. If the main LED lights 24 are not on, then the example process 30 proceeds to a first delay block 36 and a delay occurs. After the delay at the first delay block 36, the example process 30 proceeds back to the first decision block 34 again. If at the first decision block 34 the main LED lights 24 are on, then the example process 30 proceeds to a block 38 that adds a length of time to elapsed time counter 1 equal to the length of the delay in the first delay block 36.

Next at a second decision block 40, the example process 30 determines if the accrued time in elapsed time counter 1 exceeds alarm threshold 1. If the value in elapsed time counter 1 is less than alarm threshold 1, then the example process 30 proceeds back to the first delay block 36. If at the second decision block 40 the elapsed time counter 1 exceeds the alarm threshold 1, then the example process 30 intermittently illuminates the indicator LED light 26, indicating that the main LED lights 24 are nearing end-of-life, see block 42.

Next at a block 44, an elapsed time counter 2 starts. Next at a third decision block 46, the example process 30 determines if the main LED lights 24 are on. If the main LED lights 24 are not on, then the example process 30 proceeds to a second delay block 48 and a delay occurs. After the delay at the second delay block 48, the example process 30 proceeds back to the third decision block 46. If at the third decision block 46 the main LED lights 24 are on, then the example process 30 adds a length of time to the elapsed time counter 2 equal to the length of the delay in the second delay block 48, see block 50.

Next at a fourth decision block 52, the example process 30 determines if the accrued time in elapsed time counter 2 exceeds alarm threshold 2. If the value in elapsed time counter 2 is less than alarm threshold 2, then the example process 30 proceeds back to the second delay block 48. If at the fourth decision block 52 the elapsed time counter 2 exceeds alarm threshold 2, then the example process 30 disables the main LED lights 24, see block 54, then proceeds to disable the indicator LED light 26, see block 56.

FIG. 3 also includes an alternative outcome, whereby after the fourth decision block 52 the example process 30 disables the main LED lights 24 at block 54 and then proceeds to change the intermittent illumination frequency or the intermittent illumination pattern of the indicator LED light 26, see block 58.

Figure 4:
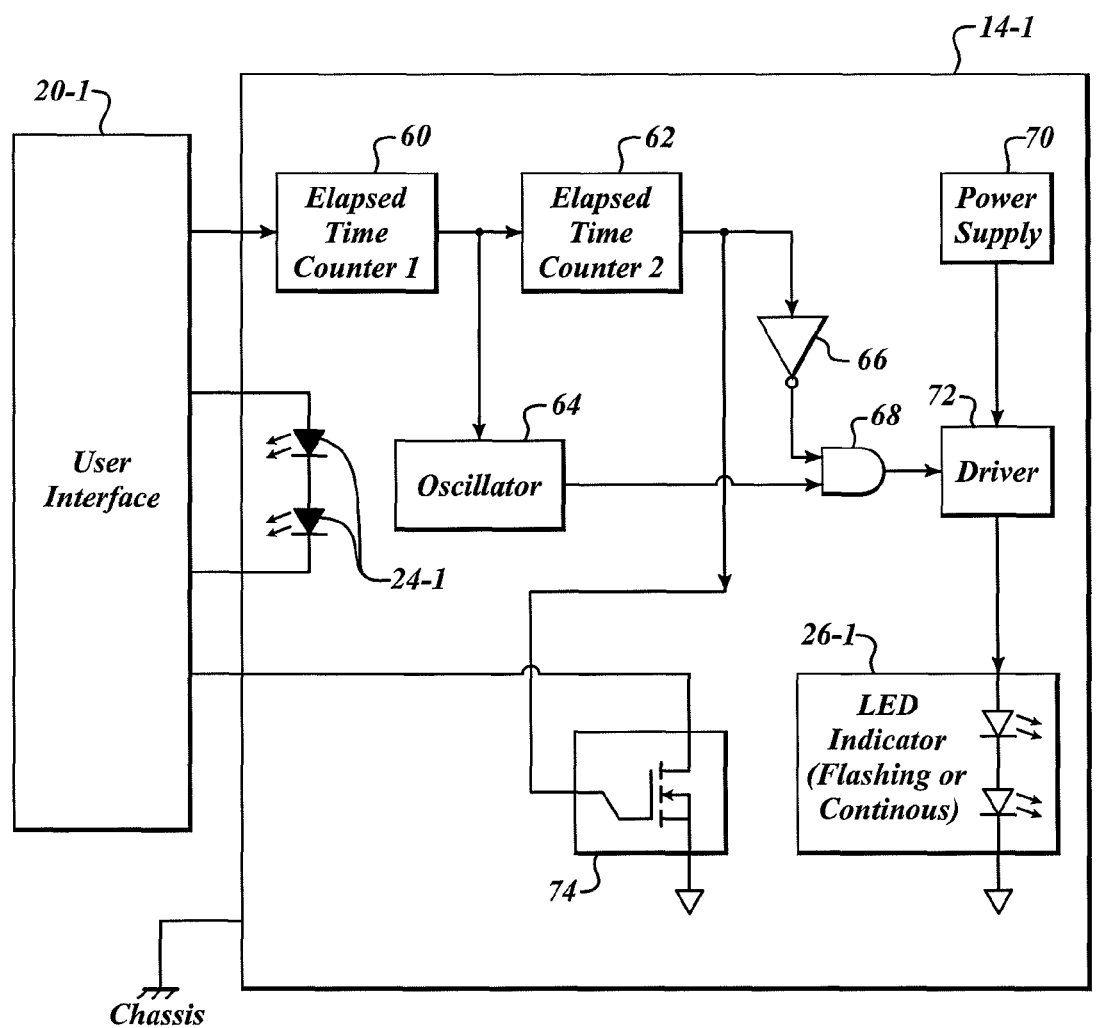
FIG. 4 illustrates an example embodiment of an LED navigation light module.

FIG. 4 illustrates an example embodiment LED navigation light module 14-1. The LED navigation light module 14-1 includes main LED lights 24-1, an indicator LED light 26-1, a first elapsed time counter 60, a second elapsed time counter 62, an oscillator 64, an inverter 66, an AND gate 68, a power supply 70, a driver 72 and a switch 74.

An example control interface 20-1 is communicatively coupled with the main LED lights 24-1, the first elapsed time counter 60, and the switch 74 of the example LED navigation light module 14-1. An output of the first elapsed time counter 60 is communicatively coupled with an input of the second elapsed time counter 62. An output of the second elapsed time counter 62 is fed to the inverter 66 which proceeds to one of a plurality of inputs of the AND gate 68. One of the inputs from the AND gate 68 is communicatively coupled to the oscillator 64, which is communicatively coupled to the output of the first elapsed time counter 60. An output of the AND gate 68 is communicatively coupled to the driver 72. The driver 72 receives power from the power supply 70. An output of the driver 72 is coupled to indicator LED light 26-1.

A positive output at the first elapsed time counter 60 triggers an oscillating positive output signal from the oscillator 64. Intermittent and/or continuous illumination of the indicator LED light 26-1 occurs by the oscillating positive output signal from the oscillator 64 in combination with a negative signal at the output of the second elapsed time counter 62. The intermittent positive signal at the output of the AND gate 68 directs the driver 72 to intermittently deliver power from the power supply 70 to the indicator LED light 26-1, causing the indicator LED light 26-1 to flash.

Disabling of the indicator LED light 26-1 occurs whenever a positive signal exists at the output of the second elapsed time counter 62. A positive signal at the output of the second elapsed time counter 62 permanently causes at least one input of the AND gate 68 to receive a negative signal because the output of inverter 66 goes low/negative. The permanently negative input prevents the AND gate 68 from enabling the driver 72 from delivering any power to the indicator LED light 26-1, thereby disabling the indicator LED light 26-1. A positive signal at the output of the second elapsed time counter 62 also causes the switch 74 to interrupt power to the main LED lights 24-1, disabling the main LED lights 24-1.

For the optional outcome of the example process 30 of FIG. 3, it should be apparent to someone skilled in the art that the circuit of FIG. 4 could be modified to allow the indicator LED light 26-1 to continue to be illuminated after the main LED lights 24 are disabled. In one embodiment, the oscillator 64 is communicatively coupled to the driver 72, bypassing the AND gate 68. Once the elapsed time counter 160 exceeds its threshold, the oscillator 64 enables the driver 72 to illuminate the indicator LED light 26-1 independent of the elapsed time counter 262.

Figure 5:
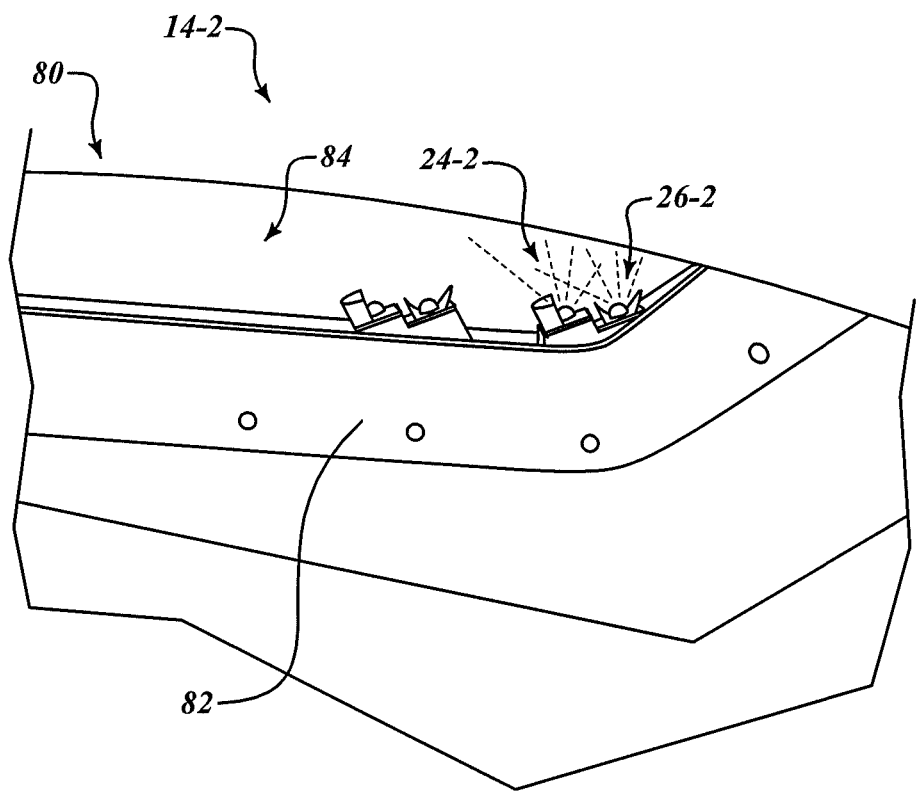
FIG. 5 illustrates a bottom view of an example embodiment of the LED navigation lights used in an LED navigation light module.

FIG. 5 illustrates a bottom (maintenance worker) view of an example LED navigation light module 14-2 formed according to another embodiment. Example navigation LED light module 14-2 includes main LED lights 24-2, an indicator LED light 26-2, a transparent lens 80, a lens frame 82 and a lens space 84. The lens frame 82 holds the lens 80 fast to the body of the vehicle 10. Within the lens space 84 defined by the lens 80 are the LED main lights 24-2 and the indicator LED light 26-2, both of which are visible from the exterior due to the transparency of the lens 80. In one embodiment, the LED navigation light module 14-2 operates consistent with the example process 30 of FIG. 3.

Figure 6:
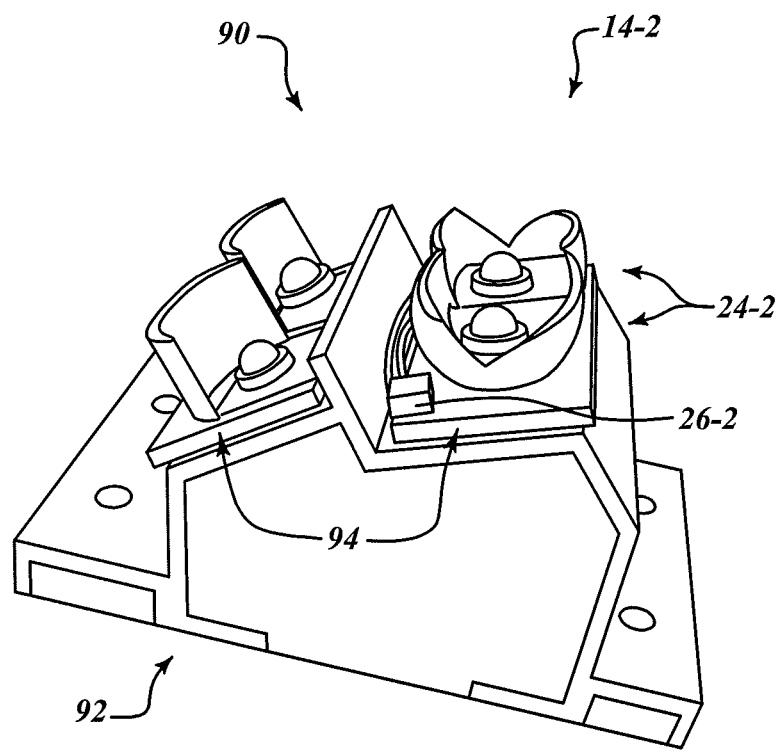
FIG. 6 illustrates a perspective view of an LED light unit from an LED navigation light module.

FIG. 6 illustrates an embodiment of how the main LED lights 24-2 and the indicator LED light 26-2 of FIG. 5 are fastened to the body of the vehicle 10. The LED navigation light module 14-2 includes an LED light unit 90. The LED light unit 90 includes a mount 92, at least one circuit board 94, the main LED lights 24-2 and the indicator LED light 26-2. In this embodiment of the LED light unit 90, a pair of main LED lights 24-2 is mounted to each of at least one circuit board 94. At least one of the circuit boards 94 includes the indicator LED light 26-2. The at least one circuit board 94, carrying at least one indicator LED light pair 24-2, is affixed to the mount 92. In this embodiment of the LED navigation light module 14-2, two LED light units 90 are included, but in alternative embodiments any number of the light units 90 can be included.

In another embodiment the indicator LED light 26-2 is 2 mm×3 mm in size and powered by 10 mA of current at 1.2 volts. The main LED light 24-2 can be Honeywell Part No. 72324693 and the entire LED anti-collision light module 14-2 can be Honeywell Part No. 72303144. However embodiments using components from other sources are still within the scope of this invention.

In yet another embodiment, the indicator LED light 26 is fitted on the aircraft so that the indicator LED light 26 is conspicuous to maintenance personnel, but does not interfere with the function of the main LED lights 24. Once the indicator LED light 26 becomes illuminated, maintenance personnel have a predetermined number of hours to replace the associated main LED light 24 prior to the main LED light 24 ceasing operation.

In a further embodiment, the LED navigation light module 14 is located on the wing 16 according to aviation regulatory requirements.

An advantage of an additional LED indicator 26 that energizes prior to the end-of-life of the main LED light 24 is that the aircraft operator can schedule for replacement during normal maintenance downtime. Scheduling for replacement can be especially important in embodiments of an LED navigation light module 14 that require the removal of a lens 80 to replace the main LED lights 24. In instances where accessing and re-assembly of the LED navigation light module can take a day, if one light is replaced but a short time later another main LED light 24 fails, a significant opportunity for cost savings can be lost. Therefore there is a practical advantage to having an indicator LED light 26 to notify maintenance personnel about other main LED lights 24 in the LED navigation light module 14 approaching their end of life.

While the preferred embodiment of the invention has been illustrated and described, as noted above, many changes can be made without departing from the spirit and scope of the invention. For example, the number of main LED lights 24 and indicator LED lights 26 in each LED light unit 90 or in each LED navigation light module 14 can vary. Alternatively, the frequency of illumination of the indicator LED light 26 can vary, or the pattern of illumination can vary from other than simply intermittent. Furthermore, a plurality of alarm stages, rather than just one, is considered within the invention's scope. Finally, it should be recognized that a number of alternative circuit embodiments to that disclosed in the LED navigation light module 14-1 of FIG. 4 are also considered included within the invention's scope. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for alerting personnel when a light emitting diode (LED) lighting component is reaching a predefined limit, the method comprising:
    determining an elapsed illumination time of the LED lighting component; and
    providing a visual indication that the determined elapsed illumination time has exceeded a first predefined threshold, wherein the provided visual indication is performed by a visible indicator different than the LED lighting component,
    wherein providing comprises enabling the visible indicator when the first predefined threshold is exceeded,
    wherein enablement of the visible indicator is intermittent,
    wherein an intermittent illumination frequency of the visible indicator is different after a second predefined threshold is exceeded than from before the second predefined threshold is exceeded, 2. The method of claim 1, wherein providing further comprises sending a signal to a remotely located control interface when the first predefined threshold is exceeded.

3. The method of claim 1, wherein the first predefined threshold corresponds to a predefined near-end-of-life period for the LED lighting component.

4. A light emitting diode (LED) position lighting apparatus comprising:
    an LED lighting component;
    a visible indicator component; and
    a controller in signal communication with the LED lighting component and the visible indicator component, the controller comprising:
        a first component in signal communication with the LED lighting component and configured to measure an elapsed illumination time of the LED lighting component; and
        a second component in signal communication with the first component and the visible indicator component, and configured to enable the visible indicator component when the first component determines the elapsed illumination time of the LED lighting component exceeds a pre-defined threshold,
    wherein the controller further comprises a third component in signal communication with the first component and configured to measure an elapsed illumination time of the LED lighting component since enablement of the visible indicator component; and
    wherein the second component is further configured to disable the visible indicator component in response to the third component.

5. The apparatus of claim 4, wherein the visible indicator component is a light emitting diode (LED).

6. The apparatus of claim 4, wherein the visible indicator component is located remotely from the LED lighting component.

7. The apparatus of claim 4, wherein the first component comprises a first elapsed time counter.

8. The apparatus of claim 4, wherein the third component comprises a second elapsed time counter.

9. The apparatus of claim 4,
    wherein the second component comprises a logical inverter, a logical AND gate, and a driver;
    wherein the first and second inputs of the logical AND gate are in signal communication with the first and third components, respectively;
    wherein the output of the logical AND gate is in signal communication with the driver; and
    wherein the logical inverter communicatively couples the third component and the second input of the logical AND gate input;
    wherein the logical inverter negates a received signal from the third component;
    wherein the logical AND gate outputs a positive signal to the driver when both received input signals are positive, and otherwise puts out a negative signal; and
    wherein the driver electrically couples a power supply to the visible indicator component when the driver receives a positive signal at its input.

10. The apparatus of claim 9,
wherein a circuit leg communicatively coupling the first component and the first input of the logical AND gate further comprises an oscillator;
wherein the oscillator is configured to cause the visible indicator component to illuminate intermittently.

11. The apparatus of claim 4, wherein the LED lighting component, the visible indicator component and the controller are housed in a single module.

12. The apparatus of claim 4, wherein the LED lighting component is a navigation light.

13. A light emitting diode (LED) position/navigation lighting system comprising:
a means for visibly designating an aircraft position;
a means for determining a first illumination time of the means for visibly designating an aircraft position;
a means for indicating that the means for visibly designating an aircraft position is exceeding a first threshold, wherein the means for indicating is enabled when the means for visibly designating an aircraft position exceeds a first threshold;
a means for determining a second illumination time of the means for visibly designating an aircraft position; and
a means for indicating that the means for visibly designating an aircraft position is exceeding a second threshold, wherein the means for indicating is disabled when the means for visibly designating an aircraft position exceeds a first threshold.

14. A method for alerting personnel when a light emitting diode (LED) lighting component is reaching a predefined limit, the method comprising:
determining an elapsed illumination time of the LED lighting component; and
providing a visual indication that the determined elapsed illumination time has exceeded a first predefined threshold, wherein the provided visual indication is performed by a visible indicator different than the LED lighting component, wherein providing comprises enabling the visible indicator when the first predefined threshold is exceeded; and
disabling the visible indicator when a second predefined threshold is exceeded.

15. The method of claim 14, wherein disabling the visible indicator includes disabling the LED lighting component.

16. The method of claim 14, wherein the second predefined threshold corresponds to a predefined end-of-life limit for the LED lighting component.

* * * * *